Figure 1:
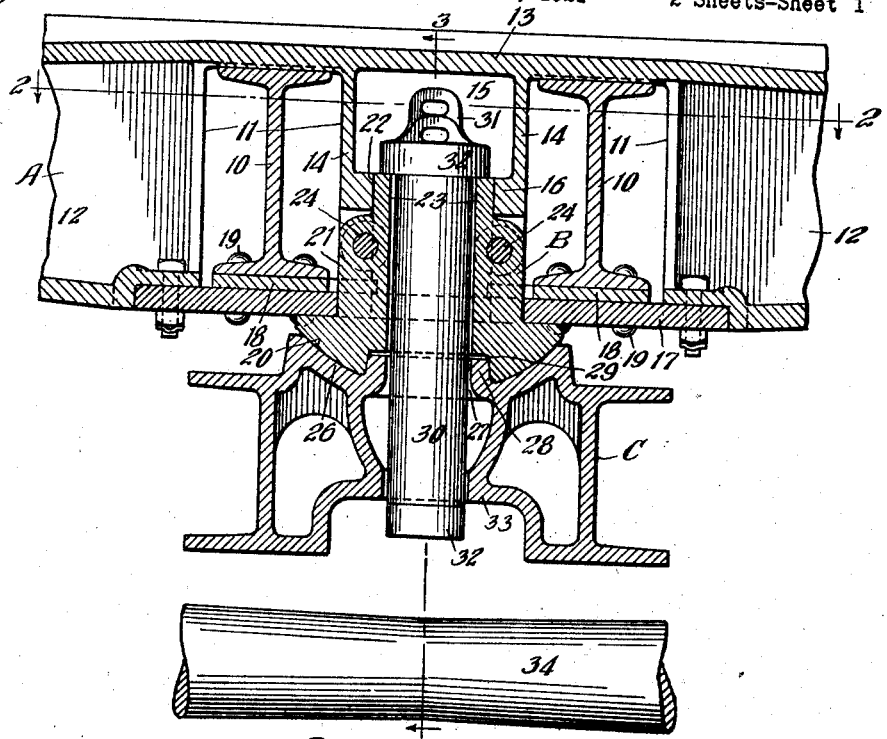

Feb. 24, 1925.

J. F. O'CONNOR

CAR CONSTRUCTION

Filed Dec. 27, 1921

1,527,376

2 Sheets-Sheet 1

Witnesses
Wm. Geiger

Inventor
John F. O'Connor
By Geo. I. Haight
His Atty.

Feb. 24, 1925.  
J. F. O'CONNOR  
CAR CONSTRUCTION  
Filed Dec. 27, 1921  
1,527,376  
2 Sheets-Sheet 2

Witnesses  
Wm. Geiger

Inventor  
John F. O'Connor  
By Geo. I. Haight  
His Atty.

Patented Feb. 24, 1925.

1,527,376

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

CAR CONSTRUCTION.

Application filed December 27, 1921. Serial No. 525,017.

*To all whom it may concern:*

Be it known that I, JOHN F. O'CONNOR, a citizen of the United States, residing at Chicago, in the county of Cook and State of Illinois, have invented a certain new and useful Improvement in Car Construction, of which the following is a full, clear, concise, and exact description, reference being had to the accompanying drawings, forming a part of this specification.

This invention relates to improvements in car construction.

In the operation of railroads, experience has demonstrated that it is highly advisable to so connect the body and truck bolsters of a car that they cannot separate vertically in event of collision or derailment since this effectually prevents or minimizes turning over or telescoping of the cars. The use of such locking means is therefore gradually increasing and spreading to all classes of cars. No especial difficulty has been experienced in applying proper locking means to cars employing four-wheel trucks since ample space is available beneath the pivotal or king pin connection of the bolsters. In the case of six-wheel trucks however, and particularly dining, buffet and baggage cars, much difficulty has been experienced in applying any suitable type of bolster locking device for the reason that the central axle of the six-wheel truck is located immediately below the pivotal center and it is impossible to obtain access from above the bolsters through the car floor on account of the stoves or other fixtures of the car being located directly over the bolsters.

Furthermore, certain railroads prefer using cast body bolsters having a continuous top web over the king pin opening and hence in such cars having six-wheel trucks, it is impossible to insert or withdraw vertically, a king pin of the locking type unless the truck is practically completely dismantled for the purpose, which is prohibitive from a practical standpoint.

One object of my invention is to provide a bolster locking connection of an efficient type and more particularly for those cases where access from above or below the king pin opening is practically impossible.

Another object of the invention is the provision of an improved bolster and king pin arrangement applicable to all conditions, to permit application of a king pin of either the usual type or of the locking type.

Other objects of the invention will more clearly appear from the description and claims hereinafter following.

Figure 2:
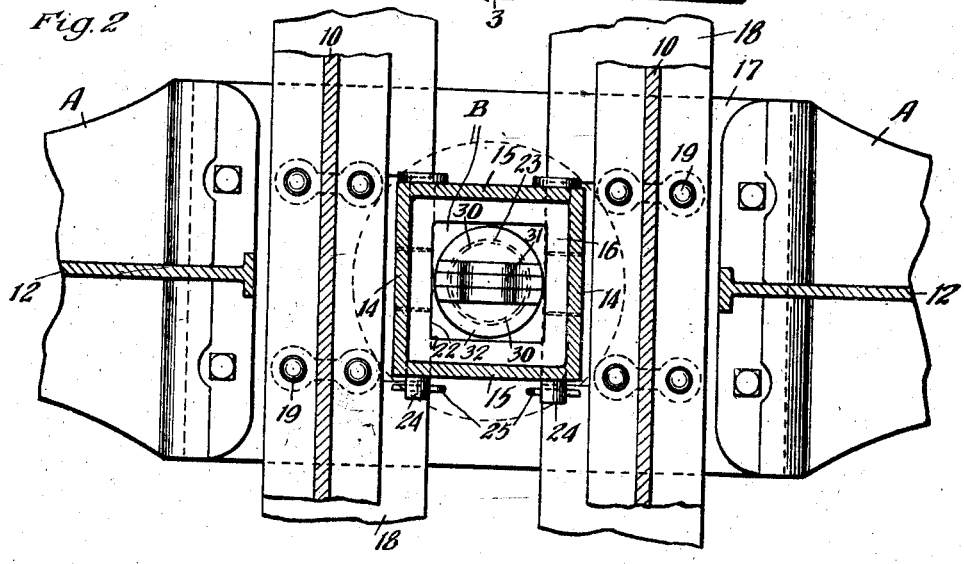
Figure 3:
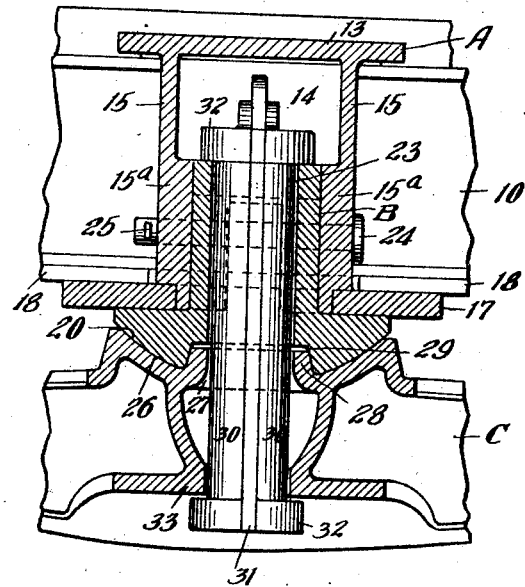
Figure 4:
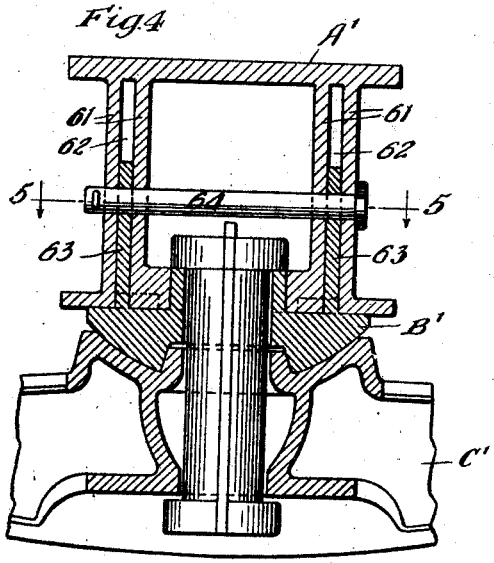
Figure 5:
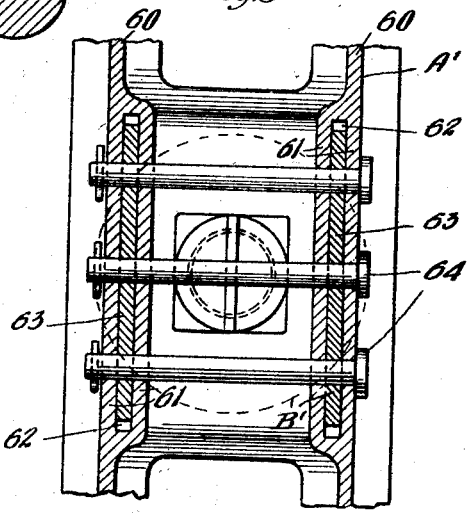

In the drawings forming a part of this specification, Figure 1 is a vertical, sectional view taken transversely of a car through the pivotal connection of the body and truck bolsters and showing my improvements in connection therewith. Figure 2 is a horizontal, sectional view corresponding to the section line 2—2 of Figure 1. Figure 3 is a vertical, sectional view taken longitudinally of the car and corresponding to the section line 3—3 of Figure 1. And Figures 4 and 5 are views corresponding respectively to Figures 3 and 2 but illustrating another embodiment of the invention, Figure 5 being taken on the section line 5—5 of Figure 4.

Referring first to the construction illustrated in Figures 1, 2 and 3, 10—10 denote I-beam center sills of a car underframe which extend through rectangular recesses 11—11 provided in a cast body bolster A. The body bolster A, in addition to its diaphragm sections 12—12, is formed with an integral top web 13 and a centrally disposed rectangular box-like section having side walls 14—14, outer and inner walls 15—15, and a thick bottom wall 16. The side walls 14—14 are of lesser height than the full height of the bolster as best shown in Figure 1, whereas the inner and outer walls 15 are continued downwardly to the bottom level of the bolster and thickened in their bottom sections as indicated best at 15ª—15ª in Figure 3. The opening at the bottom of the bolster A at its center between the diaphragm sections 12 is adapted to be closed by a bottom plate 17 bolted or otherwise rigidly secured to suitable flanges of the diaphragm sections. Plates 18 are interposed between the bottom flanges of the center sills 10 and the closure plates 17, the center sills, and the plates 17 and 18, being securely riveted as by the rivets 19—19.

To provide the body bolster with a center bearing, I employ a removable block or center bearing section designated generally by the reference B. Said center bearing section is formed on the bottom thereof with a spherical surface 20 acting as a center bearing surface proper, and with an upwardly extending heavy shank 21 fitting between the front and rear walls 15ª of the body bolster, as best shown in Figure 3. At its upper end, the shank 21 is reduced in cross section so as to fit within a correspondingly shaped square opening 22 provided in the wall 16. The removable center bearing section B is provided with a vertically extending opening 23 to accommodate the locking center pin, hereinafter described. It will be noted that the spherical bottom end of the center bearing section B extends under the closure plate 17 and is shouldered thereagainst so as to adequately sustain the load of the car body. Said center bearing section B is detachably held to the body bolster A preferably by a pair of relatively heavy pins 24—24, extended through alined openings in the shank 21 of the section B and in the said walls 15ª—15ª. Said pins 24 are headed at one end and receive cotters 25 at their other ends so as to prevent accidental withdrawal or removal of the pins. It will be noted that said pins 24 extend parallel to the center sills and hence are accessible for insertion and removal between the center sills.

The truck bolster which, in the instance shown, is of four-arm or spider form, indicated at C, is preferably provided with an integral center bearing section 26 with a concave surface cooperable with the convex or spherical surface 20 of the body bolster center bearing section B. The truck bolster C is provided also with a vertically extending opening 27 of suitable diameter alined with the opening 23. The truck bolster center bearing section is also formed with an upstanding annular flange 28 fitting in a corresponding recess 29 provided on the under side of the center bearing section B.

To lock the two bolsters together against vertical separation while at the same time permitting the truck to swivel or swing with respect to the car body as necessary, I employ a locking center pin which preferably consists of two semi-cylindrical side sections 30—30 and a central spreader 31. Each of the sections 30 is flanged at top and bottom as indicated at 32—32 so as to overlap the corresponding shoulders provided by the upper edge of the center bearing section B on the one hand and the web 33 of the truck bolster C, on the other hand. The locking pin sections 30 and flanges thereof are so made that the two of them may be inserted through the king pin openings 23 and 27 when the spreader plate 31 is not in place and after said sections 30 are properly inserted and spread apart, the spreader plate 31 is then dropped between them, thus completing the locking center pin, as will be understood.

Referring now more particularly to Figure 1, it will be noted that the web 13 of the body bolster A prohibits the insertion of a center or king pin of any type from above the bolsters. The location of the central axle of a six-wheel truck is indicated at 34 and it will be noted that the same is only a few inches below the king pin opening in the truck bolster and hence prevents the insertion of a king pin from below the bolsters. While all car underframes do not have a top web on the body bolster such as shown, a similar situation arises nevertheless in the case of dining cars and many types of buffet and baggage cars in which it is impossible to provide an opening in the floor above the king pin and hence the king pins cannot be inserted from within the body of the car.

With my arrangement, it will be noted that the two bolsters are interlocked as above described but the parts may be readily separated simply by removing the pins 24 and then jacking up the car body, leaving the center bearing section B locked with the truck bolster C. As soon as the truck bolster is withdrawn from beneath the car body, it is evident that the locking pin may be readily taken out since the top thereof is then easily accessible.

The arrangement shown is of substantial and rugged construction, is effective to prevent vertical separation of the body and truck bolsters in cases of derailment or collision and at the same time readily permits of the disconnection of the parts.

Referring next to the construction illustrated in Figures 4 and 5, the truck bolster C' is the same as that of the truck bolster C shown in the other figures. The body bolster A' is modified so as to provide transversely extending spaced webs 60—60, the latter being supplemented at the center of the bolster by inwardly spaced integral parallel webs 61—61, thus defining a pair of vertically extending and transversely elongated openings 62—62.

The removable center bearing section B' at its bottom is shaped to conform with the center bearing of the truck bolster and on its upper side is provided with upstanding spaced flanges 63—63 fitting within said recesses 62—62. The center bearing section B' is detachably but rigidly secured to the body bolster A' by a plurality of pins 64—64 extended through alined perforations in the webs 60, 61 and flanges 63. The center bearing section B' is of course interlocked with the truck bolster C' in the same manner as previously described in connection with the construction shown in Figures 1, 2 and 3.

As will be obvious to those skilled in the art, the arrangement shown in Figures 4 and 5 possesses the same advantages as the construction shown in the other figures.

I have herein shown and described what I now consider the preferred manner of carrying out the invention, but the same is by way of illustration and not by way of limitation, as I am aware that many changes and modifications may be made without departing from the spirit of the invention. All changes and modifications are contemplated that come within the scope of the claims appended hereto.

I claim:

1. In car construction, the combination with a body bolster and a truck bolster, one of said bolsters having a center bearing section permanently associated therewith; of an opposed cooperable center bearing section rigidly but detachably associated with the other of said bolsters; and means for detachably locking said bearing sections against accidental separation.

2. In car construction, the combination with a body bolster and a truck bolster, one of said bolsters having a center bearing section permanently associated therewith; of an opposed cooperable center bearing section rigidly but detachably associated with the other of said bolsters; and detachable means for locking one center bearing section against accidental vertical separation from the other center bearing section while at the same time allowing relative rotation therebetween.

3. In car construction, the combination with a body bolster and a truck bolster, the truck bolster having a center bearing section permanently associated therewith; of an independent center bearing section cooperable with said center bearing section of the truck bolster, said independent center bearing section being rigidly but detachably associated with the body bolster; and means for detachably locking said bearing sections against accidental vertical separation.

4. In car construction, the combination with a body bolster and a truck bolster, the truck bolster having a center bearing section permanently associated therewith; of an independent center bearing section cooperable with said center bearing section of the truck bolster, said independent center bearing section being rigidly but detachably associated with the body bolster; and detachable means for locking said independent center bearing section against accidental vertical separation from the other center bearing section while at the same time allowing relative rotation therebetween.

5. In car construction, the combination with a body and a truck bolster, one of said bolsters having a centrally disposed vertically extending socket and the other provided with a center bearing section rigidly associated therewith; of an opposed cooperable center bearing section having a shank fitting within said socket and detachably connected to the corresponding bolster.

6. In car construction, the combination with a body and a truck bolster, one of said bolsters having a centrally disposed vertically extending socket and the other provided with a center bearing section rigidly associated therewith; of an opposed cooperable center bearing section having a shank fitting within said socket and detachably connected to the corresponding bolster; and detachable means for locking said detachable center bearing section against accidental vertical separation from the other center bearing section while at the same time allowing relative rotation therebetween.

7. In car construction, the combination with a body bolster having a vertically extending opening at the center thereof; of a center bearing section having a vertically extending member fitting within said opening and detachably secured to said body bolster; and a truck bolster having a cooperable center bearing section; and means for detachably locking said bearing sections against vertical separation.

8. In car construction, the combination with a body bolster having a vertically extending opening at the center thereof; of a center bearing section having a vertically extending member fitting within said opening and detachably secured to said body bolster; a truck bolster having a cooperable center bearing section; and detachable means for locking said detachable center bearing section against accidental vertical separation from the other center bearing section while at the same time allowing relative rotation therebetween.

9. In a car construction, the combination with a bolster having a centrally disposed, vertically extending socket; of a central bearing section having a shank fitting within said socket, said shank being rigidly but detachably connected to said bolster.

10. In a car construction, the combination with a bolster having a centrally disposed, vertically extending socket; of an independent center bearing section, having a shank fitting within said socket; and means for detachably but rigidly connecting said shank to said bolster.

11. In a car construction, the combination with a body bolster having a centrally disposed, vertically extending socket; of a body bolster center bearing section having a shank fitting within said socket; and means extending through said shank for detachably but rigidly connecting the same with said body bolster.

12. In a car construction, the combination with a body bolster having a centrally disposed opening; of an independent body bolster center bearing section having a shank extending and fitting within said opening; and means engaging said shank for detachably connecting said center bearing section and bolster.

13. In a car having a body bolster, the center of which is inaccessible from a point above the bolster, and a six-wheel truck including a truck bolster and axle located below the center of the bolster, the combination with a center bearing section detachably associated with one of said bolsters; and means for pivotally connecting said center bearing section with the other of the bolsters and preventing vertical separation thereof.

14. In car construction, the combination with a cast body bolster having a top web at the center thereof; center sills extending through said bolster on opposite sides of the center thereof; and a center bearing section detachably connected to said bolster.

15. In car construction, the combination with a body bolster having a top tension member extending over the usual position of the king pin opening and preventing access thereto from above, and a truck bolster, one of said bolsters having a center bearing section permanently associated therewith; of an opposed cooperable center bearing section rigidly but detachably associated with the other of said bolsters; and means extending through and normally preventing vertical separation of said center bearing sections.

In witness that I claim the foregoing I have hereunto subscribed my name this 10th day of December 1921.

JOHN F. O'CONNOR.

Witnesses:
UNA C. GRIGSBY,
ANN BAKER.